United States Patent [19]

Katz et al.

[11] 4,364,913

[45] Dec. 21, 1982

[54] HNCO MANUFACTURE BY ADIABATIC AIR OXIDATION OF HCN

[75] Inventors: Daniel S. Katz, Stamford; Kenneth E. Olson, Riverside, both of Conn.

[73] Assignee: American Cyanamid Company, Stamford, Conn.

[21] Appl. No.: 305,057

[22] Filed: Sep. 24, 1981

[51] Int. Cl.³ ............................................. C01C 3/14
[52] U.S. Cl. .................................................. 423/365
[58] Field of Search ............................. 423/365, 384

[56] References Cited

U.S. PATENT DOCUMENTS

| | | | |
|---|---|---|---|
| 2,712,493 | 7/1955 | Mojé | 423/384 |
| 3,032,582 | 5/1962 | Zima | 423/384 |
| 4,032,620 | 6/1977 | Onada et al. | 423/384 |

FOREIGN PATENT DOCUMENTS 948113  1/1964  United Kingdom ............... 423/384

Primary Examiner—O. R. Vertiz
Assistant Examiner—Wayne A. Langel
Attorney, Agent, or Firm—Steven J. Hultquist

[57] ABSTRACT

A process for the air oxidation of hydrogen cyanide to isocyanic acid in the presence of a solid catalyst utilizing adiabatic conditions and controlling temperatures by the proportion of inert gas.

8 Claims, No Drawings

HNCO MANUFACTURE BY ADIABATIC AIR OXIDATION OF HCN

This invention relates to the manufacture of isocyanic acid, HNCO, by oxidation of hydrogen cyanide gas with oxygen in contact with a solid catalyst effective to promote the reaction, and in particular provides a process giving substantially complete conversion of hydrogen cyanide with high yields of isocyanic acid.

The oxidation of hydrogen cyanide in gas state using a silver catalyst has long been known. (see U.S. Pat. No. 2,712,493 to Moje). Gold and silver-gold alloy have also been used as catalyst (see U.S. Pat. No. 3,032,582 to Zima). The oxidation, as described in the literature, proceeds at relatively elevated temperatures i.e. 300°–800° C. The principal reactions are those favoring the production of cyanogen and isocyanic acid. Water is necessarily formed, as are other by-products such as carbon monoxide and carbon dioxide. In addition solids in the form of polymers of isocyanic acid are also formed. When the desired product is isocyanic acid, it is known that at least a stoichiometric proportion of oxygen must be present. (see Zima U.S. Pat. No. 3,032,582).

An important object of the present invention is to provide a process for the manufacture of isocyanic acid which can be carried out at temperatures less than 700° C. while maintaining substantially complete conversion of hydrogen cyanide with high selectivity for isocyanic acid. Operation with lower reaction temperature at the catalyst will extend the life of the catalyst.

This and other objects of the invention are obtained basically by oxidation of gaseous hydrogen cyanide with oxygen at temperatures on the order of 500°–700° utilizing a solid heterogeneous contact catalyst effective to promote the oxidation of hydrogen cyanide to isocyanic acid in which the process is carried out adiabatically utilizing a sufficient amount of inert gas in the reactant feed mixutre to regulate and maintain a steady reaction temperature without need for external cooling means.

The oxygen supplied in the reaction feed mixture should be equal to or in excess of that required stoichiometrically for the reaction:

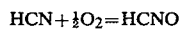

$HCN + \tfrac{1}{2}O_2 = HCNO$

Preferably the molar ratio of oxygen to hydrogen cyanide in the reaction feed mixture is between 0.5 and 0.7.

The inert gas utilized to control temperature is preferably nitrogen. Other gases inert under the reaction conditions are also suitable. The total requirements of inert gas for adiabatic operation will vary depending on the reactor construction, the catalyst utilized and the operating temperature desired. Usually, the nitrogen requirement for adiabatic operation of the process, expressed on a molar basis with respect to the hydrogen cyanide, (including any nitrogen supplied with air when the oxygen supply is air) will be about 9 to 16 moles nitrogen per mole of HCN.

Catalyst contact time is usually about 10 to 100 milliseconds. The reaction is carried out normally at or slightly above atmospheric pressure. Pressure, however, is not critical, and lower and higher pressures can be used. It is an advantage of the process that it can be operated without high pressures which would increase the danger of hydrogen cyanide leakage from the equipment.

Metal catalysts, particularly silver or gold or mixtures of both are preferred. The metal catalyst can be in the form of wire, such as gauze or chopped wire, granules or silver crystals. Silver crystals are the most preferred catalysts. A particularly desirable catalyst is silver crystals doped with palladium, as described in Feit, Kilanowski and Olson, application Ser. No. 305,058, filed concurrently herewith. The doped catalyst permits operation at substantially lower temperatures than can be obtained using silver crystals alone.

As used herein the word adiabatic defines an operation in which heat is neither added to nor extracted from the reaction mixture by external means. The heat of reaction is essentially all removed by the gas stream traversing the reactor. Adiabatic operation of the HCN oxidation is particularly advantageous since glass or ceramic reactors are preferred, and it would be difficult to remove heat through glass or ceramic walls. Steel reactors, for example, are generally undesirable since the steel may have an unwanted catalytic effect on the reaction, tending to produce excess by-products, particularly carbon monoxide and carbon dioxide. It is contemplated within the scope of the invention, however, that the walls of the reactor may have to be cooled only to the extent necessary to prevent damage when steel reactors are employed. Only a small proportion (e.g. 10%) of the heat of reaction would be removed by such cooling.

An important aspect of this invention is control of the reaction temperature essentially by adjusting the concentration of inert gas in the reactant feed mixture. It is contemplated that operation of the reaction will be carried out continuously under adiabatic conditions over extended periods of time. It is necessary during a short period at start-up to add heat in order to ignite the reaction which then continues adiabatically. Any suitable method of preheating the catalyst bed to near the ignition temperature can be used. It is important, however, to avoid temperature excursions near the 960° C. melting point of silver. To avoid this, the concentration of either one or both of the reactants, hydrogen cyanide and oxygen, may gradually be increased to the design concentration in order to control the catalyst bed temperature within prescribed limits during start-up. After the reaction becomes spontaneous and the desired reactant ratio for continuous operation is reached, the reaction temperature at the catalyst reaction zone is controlled during the continuous operation essentially by adjusting the amount of inert gas in the feed mixture.

EXAMPLES

In each of the following tabulated examples a catalyst in the amount of 50 grams was charged to a glass-lined reactor forming a 40 millimeter diameter by 13 millimeter high bed supported on quartz chips. A gaseous mixture of hydrogen cyanide, air and nitrogen was fed to the bed in each example at a flow rate, an oxygen to hydrogen cyanide molar ratio and a nitrogen to hydrogen cyanide molar ratio as indicated in Tables I, II and III for the respective runs. The Tables also show the conditions and results for each run in terms of reaction temperature, conversion based on hydrogen cyanide feed and the HNCO yield. The hydrogen cyanide in the feed contained 0.02% sulfur dioxide, as a vapor phase polymerization inhibitor.

The reactor start-up procedure was as follows: Initially the reactor and a preheat zone through which the feed stream was passed were heated electrically to 450°-600° C. with nitrogen flow at about the design rate and with air at about 40% of the design rate. Hydrogen cyanide flow was then started at the design rate and the electrical heaters were turned off. The catalyst bed temperature continued to rise 100 to 150° C. as a result of the reaction exotherm. This was followed by a temperature decrease, as the temperature dropped in the reactor preheat zone. At that point the air flow rate was increased in increments to the design rate to keep the reaction zone temperature near the target level. At the steady state (with no preheating of the mixed gas feed), final adjustments of the reaction temperature was made by adjusting the flow rate of the nitrogen diluent.

The data in the Tables were obtained at steady state adiabatic operation after the above described startup procedure.

Table I describes a series of Examples I–XVII utilizing a silver catalyst charge which was prepared by conventional electrolysis of an aqueous solution of a suitable silver salt. The purity of the silver was on the order of 99.9%, and the crystals were in needle form with varying particle size. The particular catalyst was designated at 8×30 mesh, a proprietary designation indicating particles 0.6 to 2.0 mm thick.

Table II describes a series of Examples XVIII–XXIII utilizing 8×30 mesh silver crystals, as a catalyst, which had been coated with palladium to a bulk concentration of 200 ppm, as described in the above noted Fiet, Kilanowski and Olson application.

Table III describes a series of Examples XXIV–XXVIII utilizing 8×30 mesh silver crystals, as a catalyst, which had been coated with palladium to a bulk concentration of 2000 ppm, as described in the Feit, Kilanowski and Olson application.

In each Table the Examples have been arranged in order of ascending reaction temperature. Temperatures were measured by a thermocouple attached to the reactor wall adjacent to the catalyst bed.

In all of the Examples the reaction pressure was about 16 psia and the catalyst contact times were between 19 and 36 milliseconds.

Examples I–IV represented the lowest temperatures which could be maintained with the particular reaction and catalyst. As can be seen by reference to Tables II and III, substantially lower temperatures could be maintained with the palladium on silver catalyst.

TABLE II

Ag CRYSTALS + 200 PPM Pd

| | Example No. | | | | | |
|---|---|---|---|---|---|---|
| | XVIII | XIX | XX | XXI | XXII | XXIII |
| Temp. °C. | 592 | 595 | 595 | 618 | 620 | 625 |
| HCN feed, g/hr | 37 | 50 | 50 | 66 | 50 | 50 |
| Mole Ratios | | | | | | |
| $O_2$/NCH | 0.58 | 0.60 | 0.60 | 0.58 | 0.60 | 0.60 |
| $N_2$/HCN | 11.7 | 11.7 | 11.7 | 10.4 | 11.9 | 11.6 |
| HCN conv., % | 99.6 | 99.3 | 100 | 99.9 | 99.7 | 99.8 |
| Normalized Selectivity | | | | | | |
| HNCO | 80 | 85 | 84 | 80 | 78 | 76 |
| Solids | 1.7 | 1.3 | 2.2 | 4.5 | 2.2 | 1.3 |
| CO | 2.0 | 1.1 | 1.2 | 2.4 | 2.8 | 2.1 |
| $CO_2$ | 15.4 | 10.6 | 9.5 | 9.6 | 15.9 | 19.9 |
| $(CN)_2$ | 1.3 | 1.7 | 3.3 | 3.9 | 0.78 | 0.44 |

TABLE III

Ag CRYSTALS + 2,000 PPM Pd

| | Example No. | | | |
|---|---|---|---|---|
| | XXIV | XXV | XXVI | XXVII |
| Temp. °C. | 585 | 625 | 625 | 632 |
| HCN feed, g/hr | 50.2 | 50.2 | 64.8 | 48.6 |
| Mole Ratios | | | | |
| $O_2$/HCN | 0.60 | 0.60 | 0.60 | 0.62 |
| $N_2$/HCN | 10.8 | 11.0 | 11.0 | 11.6 |
| HCN conv. % | 99.4 | 99.5 | 99.2 | 99.7 |
| Normalized Selectivity | | | | |
| HNCO | 78 | 80 | 79 | 75 |
| Solids | 4.2 | 2.2 | 2.0 | 3.2 |
| CO | 2.7 | 2.9 | 2.8 | 2.9 |
| $CO_2$ | 15.3 | 14.7 | 15.3 | 18.3 |
| $(CN)_2$ | 0.32 | 0.25 | 0.35 | 0.53 |

We claim:

1. A process for oxidation of hydrogen cyanide to isocyanic acid which comprises passing a gas feed stream of hydrogen cyanide, oxygen and inert gas under adiabatic conditions in contact with a solid catalyst effective to promote the reaction of hydrogen cyanide and oxygen to form isocyanic acid, the proportion of oxygen being at least one-half mole per mole of hydrogen cyanide, the reaction temperature at the catalyst being about 500°-700° C., and said temperature being controlled by the proportion of inert gas in said gas feed stream.

TABLE I

8 × 30 MESH Ag CRYSTALS

| | Example No. | | | | | | | | | | | | | | | | |
|---|---|---|---|---|---|---|---|---|---|---|---|---|---|---|---|---|---|
| | I | II | III | IV | V | VI | VII | VIII | IX | X | XI | XII | XIII | XIV | XV | XVI | XVII |
| Temp., °C. | 632 | 635 | 635 | 637 | 650 | 652 | 652 | 685 | 688 | 688 | 690 | 690 | 696 | 698 | 700 | 702 | 705 |
| HCN feed, g/hr | 50.0 | 31.6 | 33.8 | 50.0 | 51.7 | 48.3 | 51.7 | 50.7 | 62.5 | 75.0 | 51.7 | 51.8 | 50.3 | 63.3 | 51.7 | 62.5 | 51.9 |
| Mole Ratios | | | | | | | | | | | | | | | | | |
| $O_2$/HCN | 0.60 | 0.67 | 0.61 | 0.60 | 0.60 | 0.645 | 0.60 | 0.575 | 0.61 | 0.60 | 0.60 | 0.60 | 0.60 | 0.58 | 0.625 | 0.61 | 0.60 |
| $N_2$/HCN | 11.4 | 12.4 | 11.0 | 11.3 | 11.3 | 12.4 | 11.3 | 10.3 | 9.7 | 9.2 | 10.2 | 10.2 | 10.1 | 9.2 | 10.9 | 9.50 | 10.2 |
| HCN conv., % | 99.5 | 99.5 | 98.9 | 99.3 | 99.9 | 99.7 | 98.9 | 99.7 | 99.2 | 97.2 | 99.6 | 99.6 | 99.4 | 98.8 | 99.6 | 99.0 | 98.9 |
| Normalized[1] Selectivity % | | | | | | | | | | | | | | | | | |
| HNCO | 74 | 65 | 76 | 81 | 72 | 67 | 78 | 73 | 81 | 76 | 73 | 75 | 71 | 80 | 71 | 78 | 73 |
| Solids[2] | 0.68 | 0.73 | 3.2 | 1.4 | 1.5 | 1.1 | 2.0 | 1.0 | 2.4 | 5.1 | 4.8 | 1.0 | 3.5 | 3.1 | 1.1 | 1.4 | 5.7 |
| CO | 2.3 | 5.9 | 3.1 | 0.3 | 3.5 | 5.5 | 2.2 | 3.4 | 4.1 | 5.0 | 4.3 | 4.3 | 5.0 | 5.7 | 6.3 | 7.1 | 4.5 |
| $CO_2$ | 19.6 | 28.1 | 16.5 | 14.3 | 21.0 | 25.2 | 17.8 | 22.0 | 11.4 | 9.4 | 17.6 | 19.4 | 19.6 | 10.4 | 21.4 | 12.2 | 13.5 |
| $(CN)_2$ | 3.8 | 0.78 | 0.74 | 2.6 | 1.8 | 1.0 | NA | 0.24 | 1.3 | 4.3 | 0.21 | 0.20 | 0.44 | 1.3 | 0.25 | 0.84 | 0.11 |

[1]Normalized selectivity to component i, % = $\frac{\text{moles carbon in product i}}{\sum_j \text{moles carbon in product j}} \times 100$

[2]Solids consist of cyanuric acid, cyamelide, urea, etc.

2. The process according to claim 1 in which the inert gas is nitrogen.

3. The process according to claim 2 in which the proportion of nitrogen is between 9 to 16 moles per mole of hydrogen cyanide.

4. The process according to claim 1 in which the catalyst is silver.

5. The process according to claim 4 in which the silver catalyst is in the form of crystals.

6. The process according to claim 1 in which the proportion of oxygen is between 0.5 to 0.7 moles per mole of hydrogen cyanide.

7. The process according to claim 1 in which the contact time with the catalyst is on the order of 10 to 100 milliseconds.

8. The process according to claim 1 in which the inert gas is nitrogen, the proportion of oxygen is from 0.5 to 0.7 moles per mole of hydrogen cyanide, the proportion of nitrogen is between 9 to 16 moles per mole of hydrogen cyanide, the catalyst is in the form of silver crystals, and the catalyst contact time is on the order of 10 to 100 milliseconds.

* * * * *